United States Patent
Pang et al.

(10) Patent No.: US 10,181,207 B2
(45) Date of Patent: Jan. 15, 2019

(54) RECONSTRUCTING IMAGE

(71) Applicant: Shenyang Neusoft Medical Systems Co., Ltd., Shenyang (CN)

(72) Inventors: Ling Pang, Shenyang (CN); Liang Ren, Shenyang (CN); Shanshan Lou, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 0 days.

(21) Appl. No.: 15/719,051

(22) Filed: Sep. 28, 2017

(65) Prior Publication Data
US 2018/0089865 A1 Mar. 29, 2018

(30) Foreign Application Priority Data
Sep. 28, 2016 (CN) .......................... 2016 1 0859978

(51) Int. Cl.
G06K 9/00 (2006.01)
G06T 11/00 (2006.01)

(52) U.S. Cl.
CPC ....... G06T 11/005 (2013.01); G06T 2211/421 (2013.01)

(58) Field of Classification Search
CPC combination set(s) only.
See application file for complete search history.

(56) References Cited

U.S. PATENT DOCUMENTS 5,795,455 A * 8/1998 Pannetier ......... G01N 27/44717
  204/458
6,115,423 A * 9/2000 Shen ................. H04N 5/66
  345/204

(Continued)

OTHER PUBLICATIONS

Zhu, "Scatter Correction Method for X-Ray CT Using Primary Modulation: Theory and Preliminary Results," Dec. 2006, IEEE, IEEE Transactions on Medical Imaging.*

*Primary Examiner* — Alex Kok S Liew
(74) *Attorney, Agent, or Firm* — Fish & Richardson P.C.

(57) ABSTRACT

Methods, devices, and apparatus, including computer programs encoded on a computer storage medium for reconstructing an image are provided. An example method includes: acquiring Computed Tomography (CT) projection data of a subject, determining an image cutoff frequency $F_{img}$ according to a CT image matrix size for reconstructing a CT image and an imaging field of view size, obtaining a convolution kernel and a cutoff frequency $F_{ker}$ of the convolution kernel, using the convolution kernel as a reconstruction convolution kernel when $F_{ker} < F_{img}$; adjusting $F_{ker}$ to a product of a preset value k and $F_{img}$ and truncating the convolution kernel to obtain a portion of the convolution kernel having a cutoff frequency no more than the adjusted $F_{ker}$ as the reconstruction convolution kernel when $F_{ker} \geq F_{img}$, and reconstruct the CT image with the CT projection data and the reconstruction convolution kernel by using a convolution back-projection algorithm.

20 Claims, 3 Drawing Sheets

(56) References Cited

U.S. PATENT DOCUMENTS

| | | | | |
|---|---|---|---|---|
| 2004/0252806 A1* | 12/2004 | Taguchi | ................ | G06T 11/005 378/4 |
| 2005/0036582 A1* | 2/2005 | Nagaoka | ................ | A61B 6/032 378/19 |
| 2005/0254617 A1* | 11/2005 | Nishide | ................ | G06T 11/005 378/4 |

* cited by examiner

RECONSTRUCTING IMAGE

CROSS REFERENCE TO RELATED APPLICATION

This application claims priority to Chinese Patent Application No. 201610859978.2 entitled "METHOD AND DEVICE FOR IMPROVING DISPLAYING EFFECT of CT IMAGE" filed on Sep. 28, 2016, the entire content of which is incorporated herein by reference.

TECHNICAL FIELD

The present disclosure relates to medical image processing.

BACKGROUND

A Computed Tomography (CT) image may be obtained with projection data and a pre-set convolution kernel by using a back projection algorithm, where the projection data is collected by a CT machine. Different convolution kernels may be used to obtain different imaging effects (e.g., highlighting a bone tissue, a soft tissue, etc.) to satisfy different clinical needs.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, systems, and machine-readable storage mediums for reconstructing an image, which can eliminate aliasing artifacts of a lesion image (a CT image) collected by a CT machine and improve a quality of the lesion image collected by the CT machine.

One innovative aspect of the subject matter described in the present disclosure can be embodied in methods that include the actions of acquiring Computed Tomography (CT) projection data obtained by performing a CT scan on a subject by a CT machine; determining an image cutoff frequency $F_{img}$ according to a preset CT image matrix size $Size_{img}$ for reconstructing a CT image and an imaging field of view size FOVd; obtaining a preset convolution kernel and a cutoff frequency $F_{ker}$ of the preset convolution kernel, where a point of the convolution kernel is represented by an amplitude and a frequency; in response to a determination that $F_{ker} < F_{img}$, taking the convolution kernel as a reconstruction convolution kernel; in response to a determination that $F_{ker} \geq F_{img}$, adjusting $F_{ker}$ to be a product of a preset empirical value k and $F_{img}$, truncating the convolution kernel to obtain a portion of the convolution kernel whose frequency is no more than the adjusted $F_{ker}$, and taking the obtained portion of the convolution kernel as the reconstruction convolution kernel, where $k*F_{img}$ is less than $F_{ker}$; and reconstructing the CT image with the CT projection data of the subject and the reconstruction convolution kernel by using a convolution back-projection algorithm.

Other embodiments of this aspect include corresponding computer systems, apparatus, and computer programs recorded on one or more computer storage devices, each configured to perform the actions of the method. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The image cutoff frequency $F_{img}$ can be no more than Fs/2, where Fs represents a sample frequency of the CT machine.

In some cases, the CT image matrix size $Size_{img}$ includes one of a number of rows and a number of columns of the CT image matrix, and the imaging field of view size FOVd includes a diameter of the imaging field of view of the CT image.

In some cases, adjusting $F_{ker}$ to be the product of the preset value k and $F_{img}$ can include adjusting $F_{ker}$ to be the product of the k and the $F_{img}$ by using $F_{img}$ and a preset window function. Truncating the convolution kernel to obtain the portion of the convolution kernel can include multiplying the convolution kernel by a preset window function with a cutoff frequency of $k*F_{img}$. The window function can include one of a rectangular window and a sine window.

Another innovative aspect of the subject matter described in the present disclosure can be embodied in methods that include the actions of obtaining Computed Tomography (CT) projection data of a subject; obtaining a cutoff frequency of a convolution kernel for reconstructing a CT image; determining whether the convolution kernel cutoff frequency is smaller than an image cutoff frequency associated with a CT image matrix and an image field of view; in response to a determination that the convolution kernel cutoff frequency is smaller than the image cutoff frequency, taking the convolution kernel as a reconstruction convolution kernel; in response to a determination that the convolution kernel cutoff frequency is no smaller than the image cutoff frequency, truncating the convolution kernel to obtain a portion of the convolution kernel as the reconstruction convolution kernel, the portion of the convolution kernel having a truncated cutoff frequency smaller than the convolution kernel cutoff frequency; and reconstructing a CT image with the CT projection data of the subject and the reconstruction convolution kernel.

Other embodiments of this aspect include corresponding computer systems, apparatus, and computer programs recorded on one or more computer storage devices, each configured to perform the actions of the method. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The method can further include determining the image cutoff frequency based on a size of the CT image matrix and a size of the imaging field of view, where the CT image matrix size includes one of a number of rows and a number of columns of the CT image matrix, and the imaging field of view size includes a diameter of the imaging field of view of the CT image.

The method can further include obtaining the convolution kernel based on a corresponding scanning portion of the subject. In some cases, obtaining the convolution kernel includes determining a portion of the subject to be scanned and determining a convolution kernel for the portion of the subject. In some cases, different types of convolution kernels can be predetermined for different scanning portions of the subject and stored in a repository. Obtaining the convolution kernel can include determining a portion of the subject to be scanned and identifying a predetermined convolution kernel from the repository based on the determined portion of the subject.

In some cases, the method can further include: in response to a determination that the convolution kernel cutoff frequency is no smaller than the image cutoff frequency, adjusting the convolution kernel cutoff frequency to be a product of a predetermined value and the image cutoff frequency, the product being smaller than the convolution kernel cutoff frequency, the truncated cutoff frequency being identical to the product.

In some cases, truncating the convolution kernel to obtain a portion of the convolution kernel includes: multiplying the convolution kernel by a predetermined window function with a cutoff frequency substantially identical to the truncated cutoff frequency, where the window function includes one of a rectangular window and a sine window.

Reconstructing the CT image can include reconstructing the CT image with the CT projection data and the reconstruction convolution kernel using a convolution back-projection algorithm. The method can further include determining the image cutoff frequency to be no more than a half of a sample frequency of a CT machine that is configured to perform a CT scan on the subject to generate the CT projection data.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

In clinical practice, a detector of a CT machine can be used to collect projection data of an interior tissue of a subject, such as a bone tissue, and a soft tissue. The projection data can be then used for back projection calculation with a convolution kernel to obtain a CT image. Finally, lesion information of the subject can be determined through the CT image.

Display of a CT image can be relevant to an image cutoff frequency $F_{img}$ supported by a CT image matrix and a convolution kernel cutoff frequency $F_{ker}$ used for reconstructing an image.

In some cases, a sampling frequency $F_s$ of a CT machine is fixed, for example, the sampling frequency of the detector in the CT machine is fixed. Assuming that the maximum frequency for a data scan is $F_c$, according to a sampling theorem, a reconstructed CT image has no aliasing only when $F_s \geq 2F_c$. The maximum frequency $F_c$ for a data scan is related to the image cutoff frequency $F_{img}$ supported by the CT image matrix and the convolution kernel cutoff frequency $F_{ker}$ used for reconstructing an image. When the maximum frequency $F_c$ does not satisfy the sampling theorem, the reconstructed image may have aliasing artifacts.

When reconstructing a CT image with convolution kernel and projection data, the cutoff frequency $F_{ker}$ of the convolution kernel may be not adjusted. When the cutoff frequency $F_{ker}$ of the convolution kernel is too large, aliasing artifacts can appear in a CT image, and the image quality of the reconstructed CT images can be poor, which may lead to a misdiagnosis of a lesion.

The present disclosure provides methods and devices for reconstructing an image to improve display of a CT image. The methods and the devices can be applied to a CT machine to eliminate aliasing artifacts of a lesion image (a CT image) collected by the CT machine and improve the quality of the lesion image collected by the CT machine.

Figure 1:
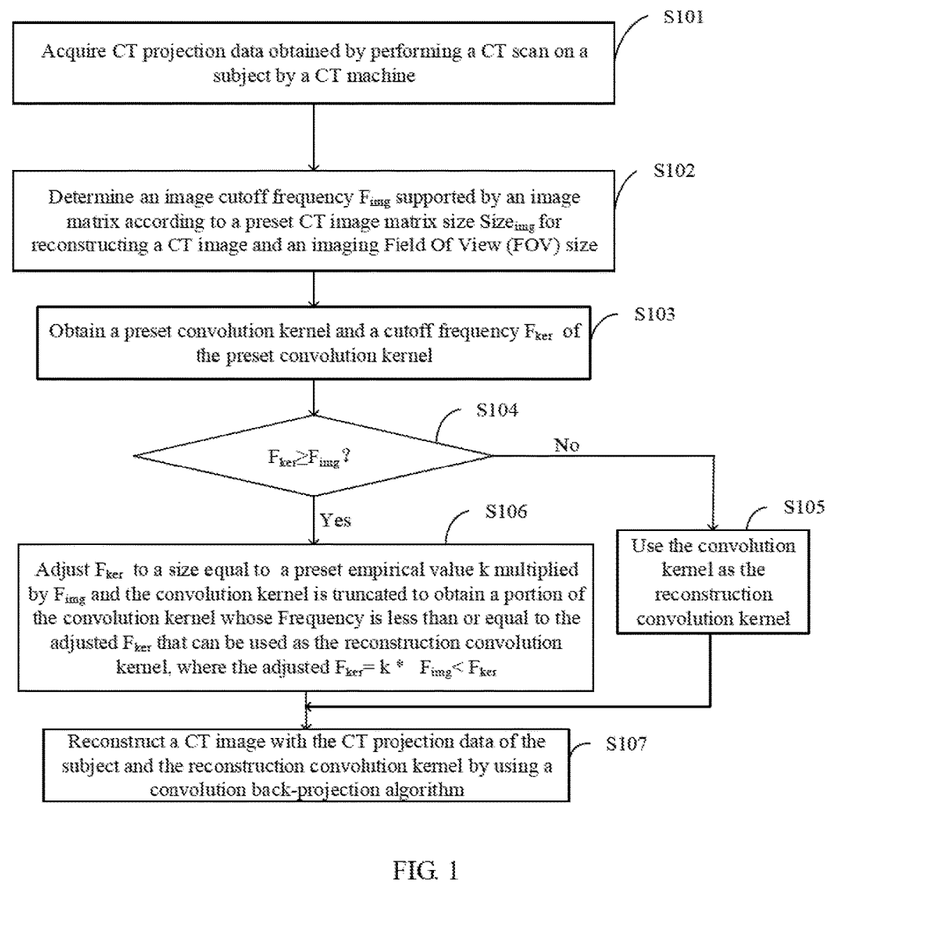
FIG. 1 illustrates a flow chart of a method of reconstructing an image according to an example of the present disclosure.

FIG. 1 illustrates a flow chart of a process of a method to reconstruct an image according to an example of the present disclosure. The process can include the following steps.

At step S101, CT projection data obtained by performing a CT scan on a subject by a CT machine is acquired.

A relative position of a detector and a radiation source in the CT machine can be fixed. The detector and the radiation source are helically rotated about a rotation center on a rotation mechanism (or a rotation system) so that positions of the detector and the radiation source may be changed with respect to a subject. Thus, the detector may obtain CT projection data for different portions of the subject (e.g., CT orthographic projection data).

At step S102, an image cutoff frequency $F_{img}$ (unit: lp/cm, i.e., line pair/cm) is determined according to a preset CT image matrix size $Size_{img}$ for reconstructing a CT image and an imaging Field Of View (FOV) size FOVd.

The $Size_{img}$ can be a preset number of rows or a preset number of columns of the CT image matrix. For example, a preset CT image matrix has m rows and n columns, where $Size_{img}=m$ or $Size_{img}=n$. For example, m=n=512, or m=n=768.

The imaging FOV size FOVd can be a diameter of the imaging FOV of the CT image. For example, if the imaging FOV can be a circle with a diameter D of 250 mm, FOVd=D=250 mm.

Formula (1) can be used to obtain the image cutoff frequency $F_{img}$ supported by the CT image matrix according to the $Size_{img}$ and the FOVd and be expressed as follows:

$$F_{img} = \frac{1}{2*FOVd/Size_{img}} = \frac{Size_{img}}{2*FOVd} \quad (1)$$

In an example, assuming that an object monitored by the CT machine may be a bone tissue, a reconstructed CT image matrix is a matrix $$\begin{bmatrix} 1200 & 1300 & ... & 1300 \\ 1300 & 1300 & ... & 1200 \\ ... & ... & ... & ... \\ 1200 & 1200 & ... & 1200 \end{bmatrix}_{768 \times 768}$$

of 768 rows and 768 columns formed by CT values of the bone tissue, and an imaging FOV for reconstructing a CT image is a circle with a diameter of 250 mm, $F_{img}$ may be determined by formula (1) to be equal to 15.36 (unit: lp/cm, i.e., line pair/cm).

At step S103, a preset convolution kernel and a cutoff frequency $F_{ker}$ (unit: lp/cm, i.e., line pair/cm) of the preset convolution kernel are obtained. The preset convolution kernel can be a plot, e.g., a curve, where each point in the preset convolution kernel may be characterized by a respective amplitude (in the unit of 1, i.e., dimensionless quantity) and a respective frequency (unit: lp/cm, i.e., line pair/cm). For different scanning portions of a subject, different types of convolution kernels can be predetermined. For example, when a patient receives scans to the head, a relatively smooth convolution kernel such as an F20 convolution kernel can be used, and when the patient receives scans to the bone tissue, a relatively sharp convolution kernel such as an F60 convolution kernel can be used. The preset convolution kernel can be stored as a data file in a storage medium such as a hard disk.

Figure 2:
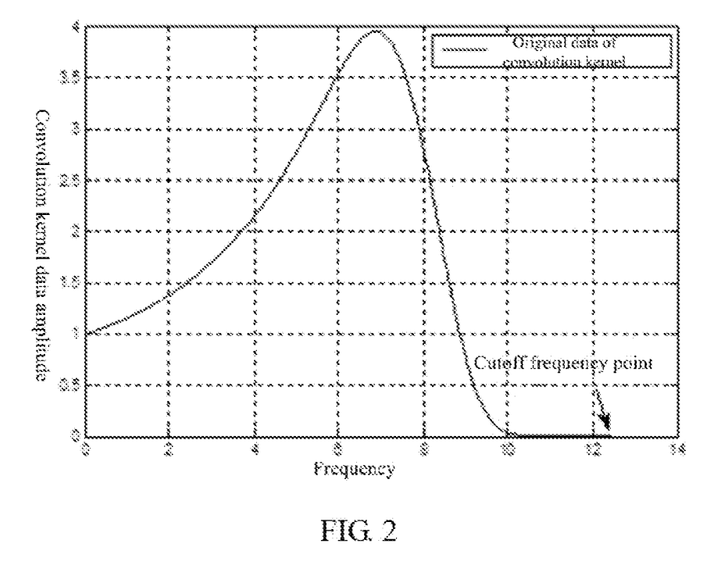
FIG. 2 illustrates a schematic diagram of a convolution kernel curve according to an example of the present disclosure.

FIG. 2 illustrates a schematic diagram of a convolution kernel curve according to an example of the present disclosure. The ordinate of the curve represents a convolution kernel amplitude, and the abscissa represents a frequency corresponding to the convolution kernel amplitude. The cutoff frequency $F_{ker}$ can be obtained from the curve, e.g., when the convolution kernel amplitude is identical to 0.

At step S104, the values of $F_{ker}$ and $F_{img}$ are compared. If $F_{ker}<F_{img}$, step S105 is executed; on the contrary, if $F_{ker} \geq F_{img}$, step S106 is executed.

Since the sampling frequency $F_s$ of the CT machine is fixed, when the maximum frequency $F_c$ for a data scan satisfies the sampling theorem $F_s \geq 2F_c$, the reconstructed CT image can have no aliasing. The maximum frequency $F_c$ for a data scan is related to the image cutoff frequency $F_{img}$ supported by the CT image matrix and the convolution kernel cutoff frequency $F_{ker}$ used for reconstructing an image and may be expressed by the following formula (2):

$$F_c = \max(F_{img}, F_{ker}) \quad (2).$$

In addition, in the present example, the image cutoff frequency $F_{img}$ can be configured to satisfy the following formula (3):

$$F_s \geq 2F_{img} \quad (3).$$

In an example, $F_{img}$ may be designed to satisfy the requirement of $F_s \geq 2F_{img}$ according to the CT image matrix size $Size_{img}$ for reconstructing a CT image and the imaging FOV size FOVd.

When $F_{ker}<F_{img}$, it indicates that the convolution kernel cutoff frequency used for reconstructing a CT image is low. If $F_{ker}$ is kept unchanged, during reconstructing the CT image, the frequency of the CT projection data of a subject can be adjusted by the convolution kernel, which may also be low.

It may be concluded from the formula (2) that $F_c=F_{img}$ when $F_{ker}<F_{img}$. According to the formula (3), it may be then concluded that $F_c$ satisfies the sampling theorem. Thus, the convolution kernel can be used as a reconstruction convolution kernel, so that the reconstructed CT image has no aliasing artifacts. Therefore, when $F_{ker}<F_{img}$, a CT image having no aliasing artifacts may be reconstructed without adjusting the value of $F_{ker}$.

When $F_{ker} \geq F_{img}$, it indicates that the convolution kernel used for reconstructing a CT image can have a high-frequency component. And when compared to $F_{img}$, the higher the $F_{ker}$ is, the convolution kernel has a higher-frequency component. More high-frequency components may be retained in the CT projection data of the subject when the CT projection data of the subject is adjusted by the convolution kernel.

It may be concluded from the formula (2) that $F_c=F_{ker}$ when $F_{ker} \geq F_{img}$. According to the formula (3), it may be then concluded that $F_c$ does not satisfy the sampling theorem when $F_s \leq 2F_{ker}$. Therefore, if the value of $F_{ker}$ is not adjusted, the reconstructed CT image may have aliasing artifacts. Thus, when $F_{ker} \geq F_{img}$, the value of the $F_{ker}$ can be adjusted. Moreover, $F_c$ equals to the maximum of $F_{img}$ and the adjusted $F_{ker}$. Thus, $F_c$ may satisfy the sampling theorem and the convolution kernel having the adjusted $F_{ker}$ is used as the reconstruction convolution kernel. In this way, the high-frequency components in the CT projection data adjusted by the convolution kernel, which do not satisfy the sampling theorem, may be effectively suppressed to ensure that the reconstructed CT image has no aliasing artifacts.

At step S105, the convolution kernel is used as the reconstruction convolution kernel.

In the present disclosure, when it is determined that $F_{ker}<F_{img}$, both the convolution kernel and $F_{ker}$ of the convolution kernel that are read at step S103 are kept unchanged, e.g., the curve of the convolution kernel shown in FIG. 2 is kept unchanged. The convolution kernel is used as the reconstruction convolution kernel to ensure that the reconstructed image reaches a beam effect supported by $F_{ker}$.

At step S106, $F_{ker}$ is adjusted to a size equal to a preset empirical value k multiplied by $F_{img}$ and the convolution kernel is truncated to obtain a portion of the convolution kernel whose frequency is less than or equal to the adjusted $F_{ker}$ that can be used as the reconstruction convolution kernel, where the adjusted $F_{ker}=k*F_{img}<F_{ker}$.

Figure 3:
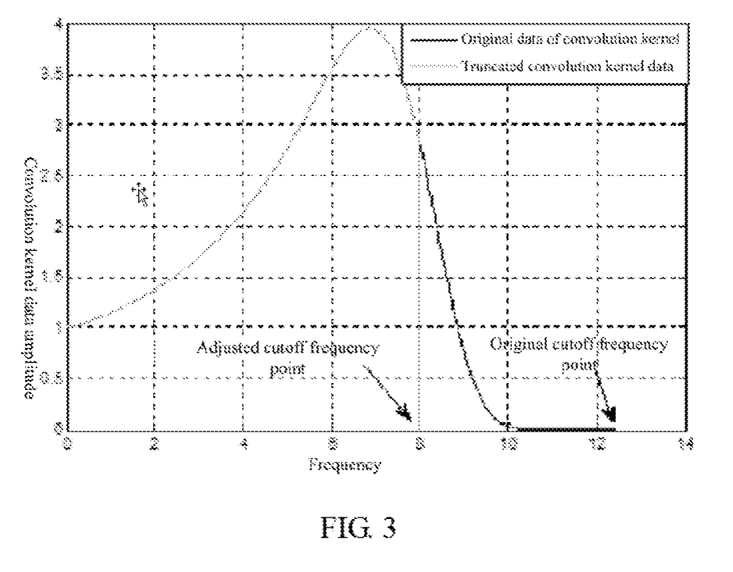
FIG. 3 illustrates a schematic diagram of the convolution kernel curve of FIG. 2, which is adjusted, according to an example of the present disclosure.

FIG. 3 illustrates a schematic diagram of a preset convolution kernel curve in FIG. 2 which has been adjusted. In this example, it is assumed that $F_{ker}$ of the original convolution kernel is 12.5 and $F_{img}$ is 10, and $F_{ker}$ is adjusted from 12.5 to 8. Accordingly, a portion of the original convolution kernel curve whose frequency is 0 to 8 is obtained by truncating the original convolution kernel curve and then used as the reconstruction convolution kernel to eliminate aliasing artifacts in the reconstructed CT image, thereby achieving the display effect supported by the $F_{img}$.

Optionally, if k=0.8, the adjusted $F_{ker}$=0.8*$F_{img}$=8.

$F_{ker}$ can be adjusted as follows: $F_{ker}$ is adjusted to be a product of k and $F_{img}$ by using $F_{img}$ and a preset window function, where k is an empirical value and less than a value obtained by dividing $F_{ker}$ before adjustment by $F_{img}$.

Herein, the window function may be determined according to the actual situation. For example, a function such as a rectangular window or a sine window may be used as the window function. $F_{img}$ represents the image cutoff frequency supported by the CT image matrix to be reconstructed.

The cutoff frequency of the window function is set as k*$F_{img}$, and the original convolution kernel curve is truncated according to the window function. In some examples, a portion of the original convolution kernel curve, whose frequency starts from the origin position to k*$F_{img}$, is obtained after the truncation.

For example, a function f ($F_{img}$, Window) may be preset. The function f ($F_{img}$, Window) indicates that the frequency of the truncated convoluted kernel is determined according to $F_{img}$ and the window function.

In an example, k*$F_{img}$ is used as the cutoff frequency of the window function which is multiplied by the original convolution kernel curve. The frequency of the original convolution kernel curve is truncated from 0 to the value of k*$F_{img}$, and the convolution kernel amplitude may be obtained, which corresponds to the frequency from 0 to k*$F_{img}$. Thereby, a new convolution kernel may be obtained as the reconstruction convolution kernel.

At step S107, a CT image may be reconstructed with the CT projection data of a subject and the reconstruction convolution kernel by means of a convolution back-projection algorithm.

Herein, if $F_{ker}$<$F_{img}$, the reconstruction convolution kernel is the convolution kernel obtained at step S103 to ensure that the reconstructed CT image of the subject reaches the display effect supported by the convolution kernel cutoff frequency $F_{ker}$.

If $F_{ker}$≥$F_{img}$, the reconstruction convolution kernel adopts a portion of the original convolution kernel truncated at step S106, whose frequency is less than or equal to the adjusted $F_{ker}$. It may not only prevent that aliasing artifacts appear in the reconstructed CT image due to that $F_{ker}$ is too large and but also ensure that the reconstructed CT image reaches the displaying effect supported by the image cutoff frequency. After $F_{ker}$ is adjusted according to the empirical value k and the $F_{img}$, the aliasing artifacts in the reconstructed CT image can be effectively filtered out, enhancing the display quality of the CT image.

The method of reconstructing an image according to the present disclosure is to adjust a convolution kernel cutoff frequency for reconstructing a CT image according to an image cutoff frequency supported by a CT image matrix so that the adjusted convolution kernel cutoff frequency matches the image cutoff frequency, which can effectively suppress high-frequency components in the convolution kernel and thus avoid aliasing artifacts in the CT image to improve the display of the CT image.

Figure 4:
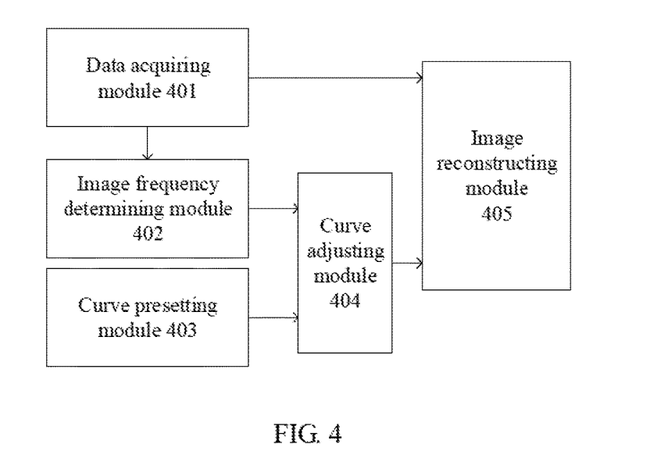
FIG. 4 illustrates a structural schematic diagram of a device for reconstructing an image according to an example of the present disclosure.

FIG. 4 illustrates a structural schematic diagram of a device for reconstructing an image according to an example of the present disclosure. The device for reconstructing an image corresponds to the above method of reconstructing an image. The content of the device for reconstructing an image may be understood or explained with reference to the example of the above method of reconstructing an image.

The device for reconstructing an image of the present disclosure includes a data acquiring module 401, an image frequency determining module 402, a curve presetting module 403, a curve adjusting module 404, and an image reconstructing module 405.

The data acquiring module 401 is configured to acquire CT projection data obtained by performing a CT scan on a subject by a CT machine.

The image frequency determining module 402 is configured to determine an image cutoff frequency $F_{img}$ according to a preset CT image matrix size $Size_{img}$ for reconstructing a CT image and an imaging field of view size FOVd, where $Size_{img}$ indicates the number m of rows or the number n of columns of the CT image matrix, and FOVd indicates a diameter size of the imaging field of view of the CT image. The image cutoff frequency $F_{img}$ supported by the image matrix can be determined by using the above formula (1).

The curve presetting module 403 is configured to obtain a preset convolution kernel and a cutoff frequency $F_{ker}$ of the convolution kernel, where the convolution kernel is represented by an amplitude and a frequency of the convolution kernel.

The curve adjusting module 404 is configured to keep the preset convolution kernel obtained by the curve presetting module 103 constant and set the preset convolution kernel as the reconstruction convolution kernel when $F_{ker}$<$F_{img}$; and adjust the $F_{ker}$ to a product of a preset empirical value k and $F_{img}$ and truncate the preset convolution kernel to obtain a portion of the convolution kernel whose frequency is less than or equal to the adjusted $F_{ker}$ as the reconstruction convolution kernel when $F_{ker}$≥$F_{img}$, where k*$F_{img}$ is less than $F_{ker}$ prior to adjustment.

k can be less than a value obtained by dividing $F_{ker}$ prior to adjustment by $F_{img}$ to ensure that the adjusted $F_{ker}$ matches the image cutoff frequency $F_{img}$ supported by the CT image matrix, which may effectively suppress high-frequency components present in the convolution kernel and thus play a role of anti-aliasing to improve the display effect of the CT image.

Optionally, the curve adjusting module 404 is further configured to use $F_{img}$ and a preset window function to adjust $F_{ker}$ to the product of k and $F_{img}$, where the window function is a function such as a rectangular window or a sine window.

The image reconstructing module 405 is configured to reconstruct a CT image with CT projection data and a reconstructed convolution kernel by using a convolution back-projection algorithm.

The device for reconstructing an image according to the present disclosure is to adjust the convolution kernel cutoff frequency $F_{ker}$ for reconstructing a CT image according to the image cutoff frequency $F_{img}$ supported by the CT image matrix so that the adjusted convolution kernel cutoff frequency $F_{ker}$ matches the image cutoff frequency $F_{img}$, which can effectively suppress high-frequency components present in the convolution kernel and thus avoid aliasing artifacts in the CT image to improve the displaying effect of the CT image.

Figure 5:
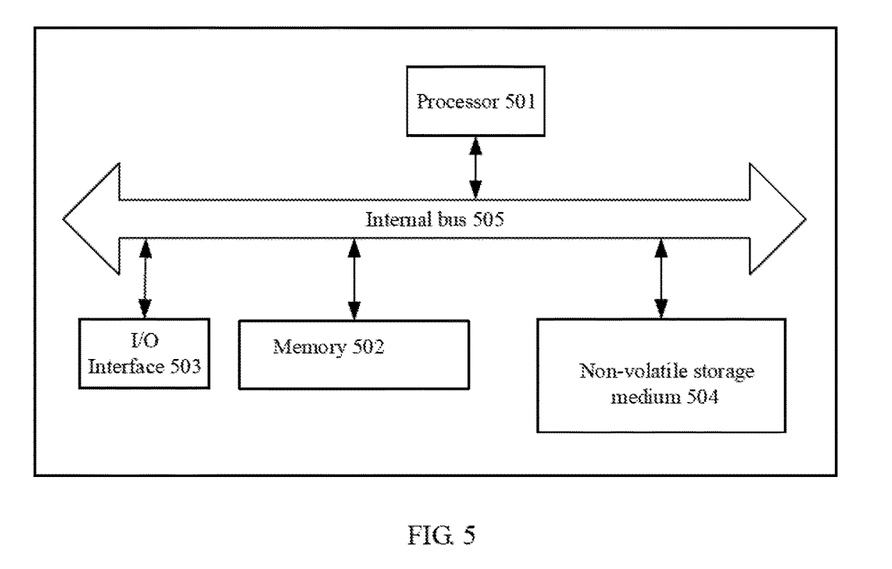
FIG. 5 illustrates a hardware structural diagram of a CT machine according to an example of the present disclosure.

Depending on different scenarios of an application, the device may be a service logic implemented by software, or may be hardware or a device of a combination of hardware and software. The device of the present disclosure is described below with software implementation as an example. A logical device, implemented by software, may be formed by a processor of a device located with the device by reading corresponding machine-executable instructions in a non-volatile storage medium to a memory and executing them. FIG. 5 illustrates a hardware structural diagram of a CT machine located with the software device according to an example of the present disclosure. The CT machine may include other hardware in addition to a processor 501, a memory 502, an IO interface 503, a non-volatile storage medium 504, and an internal bus 505, which will not be described again.

Herein, the processor 501 may be caused to execute the following operations by reading and executing the machine-executable instructions stored in the non-volatile storage medium 504:

acquiring Computed Tomography (CT) projection data obtained by performing a CT scan on a subject by a CT machine;

determining an image cutoff frequency $F_{img}$ according to a preset CT image matrix size $Size_{img}$ for reconstructing a CT image and an imaging field of view size FOVd;

obtaining a preset convolution kernel and a cutoff frequency $F_{ker}$ of the preset convolution kernel, where the convolution kernel is represented by an amplitude and a frequency of the convolution kernel;

using the convolution kernel as a reconstruction convolution kernel when $F_{ker} < F_{img}$;

adjusting $F_{ker}$ to a product of a preset empirical value k and $F_{img}$ and truncating a portion of the convolution kernel whose frequency is less than or equal to the adjusted $F_{ker}$ as the reconstruction convolution kernel when $F_{ker} \geq F_{img}$, where $k*F_{img} < F_{ker}$; and reconstructing the CT image with the CT projection data of the subject and the reconstruction convolution kernel by using the convolution back-projection algorithm.

Herein, when adjusting the $F_{ker}$ to the product of the preset empirical value k and $F_{img}$, the processor 501 may be further caused to: use the $F_{img}$ and a preset window function to truncate the $F_{ker}$ to the product of the k and the $F_{img}$, where the window function includes a rectangular window or a sine window.

The $Size_{img}$ indicates the number of rows or the number of columns of the CT image matrix, and the imaging field of view size indicates a diameter size of the imaging field of view of the CT image.

The term used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

For simplicity and illustrative purposes, the present disclosure is described by referring mainly to examples thereof. In the above descriptions, numerous specific details are set forth to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The above description is merely preferred examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

The invention claimed is:

1. A method of reconstructing an image, comprising:
acquiring Computed Tomography (CT) projection data obtained by performing a CT scan on a subject by a CT machine;
determining an image cutoff frequency $F_{img}$ according to a preset CT image matrix size $Size_{img}$ for reconstructing a CT image and an imaging field of view size FOVd;
obtaining a preset convolution kernel and a cutoff frequency $F_{ker}$ of the preset convolution kernel, wherein a point of the convolution kernel is represented by an amplitude and a frequency;
in response to a determination that $F_{ker} < F_{img}$, taking the convolution kernel as a reconstruction convolution kernel;
in response to a determination that $F_{ker} \geq F_{img}$, adjusting $F_{ker}$ to be a product of a preset empirical value k and $F_{img}$, truncating the convolution kernel to obtain a portion of the convolution kernel whose frequency is no more than the adjusted $F_{ker}$, and taking the obtained portion of the convolution kernel as the reconstruction convolution kernel, wherein $k*F_{img}$ is less than $F_{ker}$; and
reconstructing the CT image with the CT projection data of the subject and the reconstruction convolution kernel by using a convolution back-projection algorithm.

2. The method of claim 1, wherein adjusting $F_{ker}$ to be the product of the preset value k and $F_{img}$ comprises:
adjusting $F_{ker}$ to be the product of the k and the $F_{img}$ by using $F_{img}$ and a preset window function.

3. The method of claim 1, wherein truncating the convolution kernel to obtain the portion of the convolution kernel comprises:
multiplying the convolution kernel by a preset window function with a cutoff frequency of $k*F_{img}$.

4. The method of claim 3, wherein the window function includes one of a rectangular window and a sine window.

5. The method of claim 1, wherein the image cutoff frequency $F_{img}$ is no more than Fs/2, where Fs represents a sample frequency of the CT machine.

6. The method of claim 1, wherein the CT image matrix size $Size_{img}$ includes one of a number of rows and a number of columns of the CT image matrix, and the imaging field of view size FOVd includes a diameter of the imaging field of view of the CT image.

7. A device for reconstructing an image, comprising:
a processor; and
a machine-readable storage medium in which machine-executable instructions are stored, wherein, by executing the machine-executable instructions, the processor is caused to:
acquire Computed Tomography (CT) projection data obtained by performing a CT scan on a subject by a CT machine;
determine an image cutoff frequency $F_{img}$ according to a preset CT image matrix size $Size_{img}$ for reconstructing a CT image and an imaging field of view size FOVd;
obtain a preset convolution kernel and a cutoff frequency $F_{ker}$ of the preset convolution kernel, wherein a point of the preset convolution kernel is represented by an amplitude and a frequency of the convolution kernel;
in response to a determination that $F_{ker} < F_{img}$, take the convolution kernel as a reconstruction convolution kernel;
in response to a determination that $F_{ker} \geq F_{img}$, adjust $F_{ker}$ to a product of a preset empirical value k and $F_{img}$ and truncating the preset convolution kernel to obtain a portion of the convolution kernel whose frequency is no more than the adjusted $F_{ker}$ as the reconstruction convolution kernel, wherein $k*F_{img}$ is less than $F_{ker}$; and
reconstruct the CT image with the CT projection data of the subject and the reconstruction convolution kernel by using a convolution back-projection algorithm.

8. The device of claim 7, wherein the processor is caused to:
adjust $F_{ker}$ to be the product of k and $F_{img}$ by using $F_{img}$ and a preset window function.

9. The device of claim 7, wherein the processor is caused to truncate the preset convolution kernel to obtain the portion of the preset convolution kernel by multiplying the convolution kernel by a preset window function with a cutoff frequency of $k*F_{img}$.

10. The device of claim 9, wherein the window function includes one of a rectangular window and a sine window.

11. The device of claim 7, wherein the processor is caused to determine the image cutoff frequency $F_{img}$ to be no more than Fs/2, where Fs represents a sample frequency of the CT machine.

12. The device of claim 7, wherein the CT image matrix size $Size_{img}$ includes one of a number of rows and a number of columns of the CT image matrix, and the imaging field of view size FOVd includes a diameter of the imaging field of view of the CT image.

13. A method of reconstructing an image, comprising:
obtaining Computed Tomography (CT) projection data of a subject;
obtaining a cutoff frequency of a convolution kernel for reconstructing a CT image;
determining whether the convolution kernel cutoff frequency is smaller than an image cutoff frequency associated with a CT image matrix and an image field of view;
in response to a determination that the convolution kernel cutoff frequency is smaller than the image cutoff frequency, taking the convolution kernel as a reconstruction convolution kernel;
in response to a determination that the convolution kernel cutoff frequency is no smaller than the image cutoff frequency, truncating the convolution kernel to obtain a portion of the convolution kernel as the reconstruction convolution kernel, the portion of the convolution kernel having a truncated cutoff frequency smaller than the convolution kernel cutoff frequency; and
reconstructing a CT image with the CT projection data of the subject and the reconstruction convolution kernel.

14. The method of claim 13, further comprising:
determining the image cutoff frequency based on a size of the CT image matrix and a size of the imaging field of view, and
wherein the CT image matrix size includes one of a number of rows and a number of columns of the CT image matrix, and the imaging field of view size includes a diameter of the imaging field of view of the CT image.

15. The method of claim 13, further comprising:
obtaining the convolution kernel based on a corresponding scanning portion of the subject.

16. The method of claim 13, further comprising:
determining the image cutoff frequency to be no more than a half of a sample frequency of a CT machine that is configured to perform a CT scan on the subject to generate the CT projection data.

17. The method of claim 13, further comprising:
in response to a determination that the convolution kernel cutoff frequency is no smaller than the image cutoff frequency, adjusting the convolution kernel cutoff frequency to be a product of a predetermined value and the image cutoff frequency, the product being smaller than the convolution kernel cutoff frequency, the truncated cutoff frequency being identical to the product.

18. The method of claim 13, wherein truncating the convolution kernel to obtain a portion of the convolution kernel comprises:
multiplying the convolution kernel by a predetermined window function with a cutoff frequency substantially identical to the truncated cutoff frequency.

19. The method of claim 18, wherein the window function includes one of a rectangular window and a sine window.

20. The method of claim 13, wherein reconstructing the CT image comprises reconstructing the CT image with the CT projection data and the reconstruction convolution kernel using a convolution back-projection algorithm.

* * * * *